9354X
E. BRIGGS & G. G. CARPENTER.
MOWING, THRASHING, AND CLEANING GRAIN.
Patented Feb. 5, 1836.
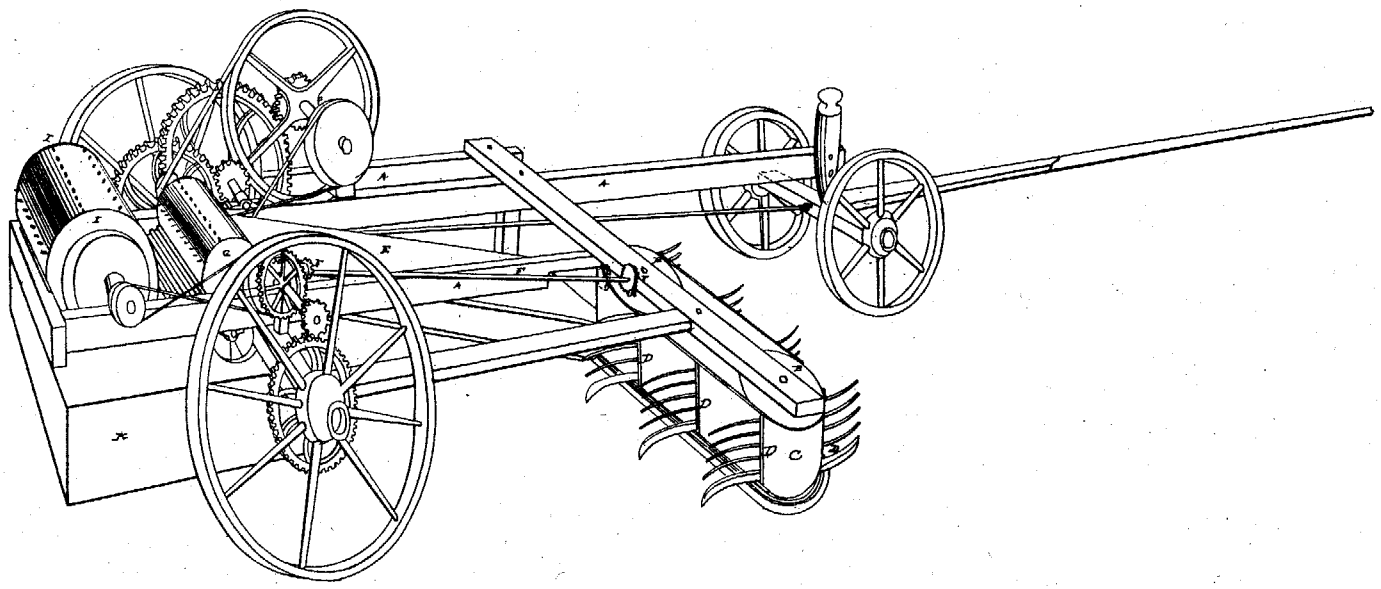
THE NORRIS PETERS CO., PHOTO-LITHO., WASHINGTON, D. C.

9354X

Feb 5, 1836

Eliakim Briggs and George G Carpenter of Franklin Co. N.Y.

Letters Patent

The Schedule referred to in these Letters Patent and making part of the same containing a description in the words of the said Eliakim Briggs and George G Carpenter themselves of their improvement in the machine for Mowing, Thrashing and cleaning Grain To all to whom these Presents shall come: Be it Known that We Eliakim Briggs and George G. Carpenter of Fort Covington in the County of Franklin and State of New York, have invented a new and useful improvement in harvesting Thrashing and Cleaning Grain, and that the following is a full and exact description of the construction and operation of said machine as invented by us. The machine may be erected upon four wheels, like the four wheels of a a waggon, and the team harnessed to it as to a Waggon. The fore axle tree is four, and the hind axle tree ten feet long. They are nine feet apart and connected by a reach one foot wide and fourteen feet long, with a parallel reach framed to its right two feet from it, but eleven feet long. At the right are two Sythes six feet long, and four feet apart attached to an arbor parallel with, and six feet forward of the hind axletree, by arms winding them twenty two and a half degrees as they rotate to cut. A crank connected to the Sythe arm will meet a quadrant on the parallel reach and press the wire screen between the Sythes forward of their edges to let the cut grain slide down from it on to the first feeder, enclosing two arbors three feet long and six asunder, supported with the Sythes above by timbers framed to the reach and hind axletree. Said first feeder will run parallel with the Sythes, and at right angles and convey the grain on to a second feeder of like fashion, but running backwards six feet conveys the grain aft between the reaches, into the thrasher which is two feet long and one in diameter. Directly back of this is a cylinder two feet long and equal diameter hav-
ing teeth to seperate the straw from the grain and close under
it a concave of half inch spaces and bars set to an angle
of forty five degrees, under the fore end of this is a cylinder
one foot in diameter with an aperture in its back and inside
a fan, to blow the chaff as the grain falls through the concave
into a large box. To the right hind wheel hub attach a
coged wheel two feet in diameter geared to a six inch wheel
on the arbor of a ten inch pulley with a belt enclose this with
an eight inch pulley on the sythe arbor join to the ten inch
an eighteen pulley enclose it with a band around the inner
feed roll. enclose also the eighteen inch with a band around
a six inch pulley on the seperators arbor: joined to a twen-
ty inch pulley enclosed by a band around a three inch pulley on the
fan. But when expedient let there be instead of the above
described sythe and first feeder a beam reaching from the hind
axletree three feet forward, and one upward, append to the
fore end of this a beam four feet long parallel with the axletree
Two and a half feet below this frame to it a like beam be
tween these two pendent beams put two upright cylinders
eighteen inches in diameter and two feet asunder, enclose
these with a belt two and a half feet wide; having in it eight
upright rods, to each rod four fingers and a sythe each one
feet long the lower ends of said rods make an angle from
the sythes heel backward eight inches and run in a groove
between the foresides of the cylinders to keep the sythes and fin-
gers at right angles with the belt while cutting and conveying
the grain on to the feeder of the thresher; these upright cyl
inders may be geared to the right hind wheel by two pairs
of bevel coged wheels connected by an arbor three feet long,
Attach to the left hind wheel hub a coged wheel, two feet
in diameter geared to an eight inch wheel on an arbor ten
inches long placed on the reach and on a plank five feet long framed to the reach and a wheel two and a half feet in diameter is joined to the eight inch and geared to a seven inch wheel on the arbor of a two foot wheel geared to a six inch wheel on the arbor of the thresher; the arbor of the two foot wheel rests ten inches above the sides of the thresher on posts. and on it is a nine inch pulley, around which is a band crossed enclosing the hind feed Roll.

So when the machine is moved forward; the left hind wheel following in the track of the left fore wheel: the whole operation receiving its propelling power from the team that moves it.

We claim especially the manner and principles of applying the power of a team. to cutting, threshing. and cleaning grain. by moving forward the machine, of cutting grain of conveying it to the thresher, of threshing and of cleaning grain by power so applied.

In witness that the foregoing is a true and correct description of our said invention We have hereunto set our hands in Fort Covington aforesaid on the twenty ninth day of October in the year of our Lord one thousand Eight hundred and thirty five Witnesses
Daniel Parkhurst
J. Wallace Eliakim Briggs
George G. Carpenter

[illegible]

(996 words) Drawing (Granted 5th February 1836)